Sept. 1, 1936.  E. G. KESLING  2,052,573
GEAR SHIFTING MECHANISM
Filed April 20, 1934    4 Sheets-Sheet 1

Sept. 1, 1936.   E. G. KESLING   2,052,573
GEAR SHIFTING MECHANISM
Filed April 20, 1934   4 Sheets-Sheet 2

Inventor
Elmer G. Kesling
by Rippey & Kingsland
His Attorneys

Sept. 1, 1936.  E. G. KESLING  2,052,573
GEAR SHIFTING MECHANISM
Filed April 20, 1934   4 Sheets—Sheet 3

Inventor
Elmer G. Kesling
by Kyspey & Kingsland
His Attorneys

Patented Sept. 1, 1936

2,052,573

UNITED STATES PATENT OFFICE 2,052,573

GEAR SHIFTING MECHANISM

Elmer G. Kesling, Bloomfield, Mo.

Application April 20, 1934, Serial No. 721,509

47 Claims. (Cl. 74—335)

This invention relates to gear shifting mechanism, and has special utility as a part of the transmission gearing of automobiles and other vehicles.

Objects of the invention are to provide a gear shifting mechanism having a single actuator for performing selecting, interlock control and shifting operations; to provide a mechanism capable of free operation and requiring a minimum of effort to effect the operations of selection and interlock control; to provide a construction and arrangement of cooperative parts whereby a complete shifting operation may be manually performed, if desired; to provide such a mechanism whereby the initial shifting movement may be imparted manually and the operation of the engine or motor utilized to impart the final movements to the shifting operation under either selection and with or without the application of manual force; to provide means made integral and directly cooperating with the actuator for positively holding the unselected gear shifter devices in their neutral positions while the selected gear shifter devices are moved from their neutral positions; to provide mechanism whereby the manual control device will be normally locked against shifting movements when brought to neutral position; to provide mechanism whereby rotative movement of the manual control device substantially to or beyond a selected position will release the neutral lock whereupon the selected gear may be shifted; to provide resilient means within the manual operating shaft against which means the neutral releasing movements act and by which means the manual control is automatically returned to normal relative position when released; and to provide operating means having an approximately equal range of movement for actuating the shifter devices having an unequal range of movement.

Various other objects and advantages of the invention will be made apparent from the following description, reference being made to the annexed drawings, in which—

An elongated hub 1 is mounted for rotation in a bearing 2 in a casing 3 and has an integral gear 4 which meshes with a rack 5 integral with a low and reverse shifting yoke 6.

Figure 1:
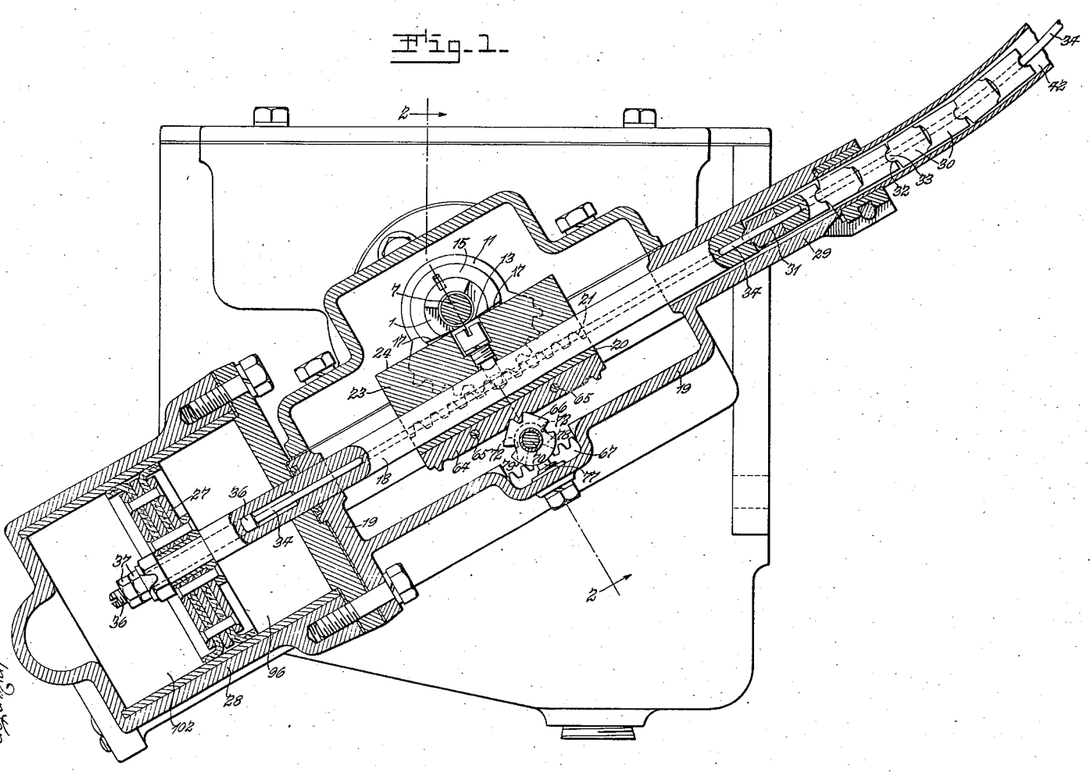
Fig. 1 is a vertical sectional view on the line 1—1 of Fig. 2 showing the connection of the operating mechanism with the devices to be directly operated thereby.
Figure 2:
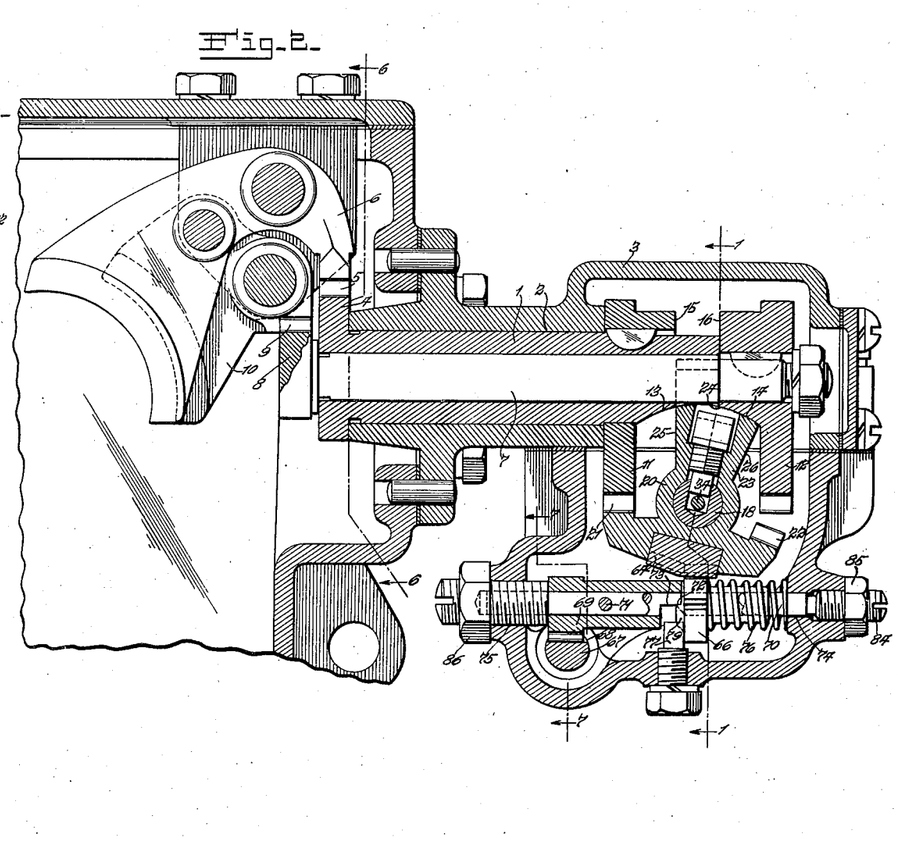
Fig. 2 is an enlarged sectional view on the line 2—2 of Fig. 1.
Figures 3, 4:
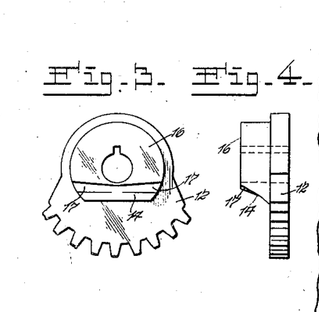
Fig. 3 is a side elevation of the gear segment attached to the spindle for operating a part of the gear shifter elements.
Fig. 4 is a side edge view of said gear segment.
Figure 5:
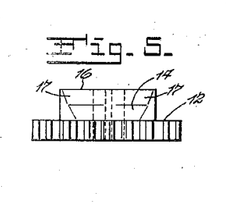
Fig. 5 is an elevation illustrating the teeth and hub formation of said gear segment.
Figure 6:
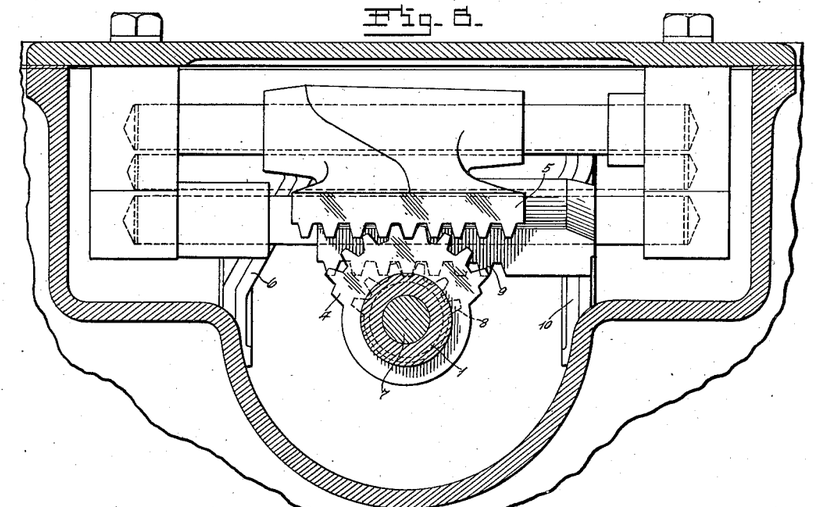
Fig. 6 is a vertical sectional view on the line 6—6 of Fig. 2.

A shaft 7 is mounted for rotation in the hub 1 and has an integral gear 8 which meshes with a rack 9 integral with a high and intermediate shifting yoke 10. As clearly shown (Fig. 2), the gear 4 is formed on a longer radius of curvature than the gear 8. Consequently, turning of the hub 1 and the shaft 7 through equal ranges or angles of rotation will move the shifter elements 6 and 10 unequal distances. Specifically, the shifter element 6 will be moved by the hub 1 a greater distance than the shifter element 10 will be moved by the shaft 7 by equal turning movements of said hub 1 and shaft 7, respectively.

A segmented gear 11 is secured upon the hub 1 near the end of the hub and a segmented gear 12 is secured on the adjacent projecting end of the shaft 7.

The adjacent hubs of the gears 11 and 12 have cutaway portions forming surfaces 13 and 14 and have end walls 15 and 16, respectively. The surfaces 13 and 14 are relieved as at 17 for purposes hereafter noted.

A shaft 18 is mounted for rocking and longitudinal movements in a casing 19 which is secured to the casing 2.

Secured to the shaft 18 is an actuator 20 which is moved with the shaft 18. The actuator 20 has rack teeth 21 and 22 which selectively mesh with the gears 11 and 12, respectively. The actuator also has a projecting rib 23, which has a circular surface 24 and flat side walls 25 and 26.

The shaft 18 projects beyond the casing 19 and is rotatively secured in a piston 27 which moves with the longitudinal movements of the shaft 18 in a vacuum cylinder 28 secured to the adjacent end of the casing 19. The other end of the casing 19 has a tubular projection 29.

The shaft 18 is one end element of a segmented shaft with segments 30 arranged in end to end relation with an axial hole 31 and interlocking pivotal ends 32 and 33. The shaft 18 has an axial hole also.

A single wire core 34 is secured to one end member 35, extends through the segments 30 and the shaft 18, and extends beyond the shaft 18 in an enlarged threaded portion 36 on which nuts 37 are screwed for the purpose of adjusting the working clearance between the parts of the segmented shaft.

The other end of the member 35 is secured in the end of a tubular shaft 38, having a thickened wall portion 39, by means of a pin 40. The tubular shaft 38 is mounted for rocking and longitudinal movements in a supporting member 41.

The segmented shaft is mounted for turning and longitudinal movements within a curved guide tube 42, one end of which is secured to the end of the tubular projection 29 and the other end of which is adjustably secured within one end of the member 41 by bolts 43 and 44.

The member 41 is secured to the instrument panel 45.

A shaft 46 is mounted for rocking movement in the tubular shaft 38 by a block 47 which is secured to the shaft 46 and projects into a slot 48 in the wall of the tubular shaft 38. The slot 48 is circumferentially longer than the block 47, allowing the shaft 46 to rock a certain number of degrees in the tubular shaft 38.

The shaft 46 extends beyond the end of the tubular shaft 38 and has a hand hold 49 secured thereto. A V-shaped groove 50 is formed across the other end of the shaft 46.

A cylindrical block 51 has a pointed V-shaped end 52, a slot 53 cut diametrically across the other end and an axial hole 54 ending short of the pointed end 52. The block 51 is mounted for longitudinal movement only in the tubular shaft 38, having the pointed end 52 placed in the groove 50, and being held against rotation by a pin 55' which is secured in the wall of the tubular shaft 38 and which is embraced by the slot 53.

A compression spring 56 is placed within the hole 54 and abuts against the bottom of the hole 54 and against a spring seat 55 held by a pin 55', urging the block 51 against the shaft 46, so that the shaft 46 in normal position is held in a certain rotative relation to the tubular shaft 38 and the segmented shaft secured thereto. Therefore, when manual force is applied to the hand hold 49 to rock the shaft 46 out of the said normal position the cam action of the V formations 50 and 52 will force the block 51 endwise against the action of the spring 56. The spring 56 will return the shaft 46 to the said normal position when the force applied to the hand hold 49 is released. The segments 30 and members 18 and 35, tubular shaft 38 and the shaft 46 form the manual operating shaft.

The turning movements of the manual operating shaft are gear selective movements and the longitudinal movements of the manual operating shaft are port controlling and gear shifting movements. With a construction providing sufficient lost motion between the different connected parts, this port controlling movement need not necessarily move the gears.

A reverse and intermediate speed notch 57, a neutral notch 58 and a low and high speed notch 59 are, respectively, cut in spaced relation into the wall of the tubular shaft 38. The neutral notch 58 is cut into the substance of the shaft 46 forming a notch 60 in the said shaft 46.

A spring pressed ball 61 is mounted in a hole 62 in a projection 63 on the member 41 for engagement with the notches 57, 58 and 59.

The notch 60 in conjunction with the notch 58 forms a neutral lock.

The notch 60 is deep enough and circumferentially long enough so that longitudinal movements of the manual operating shaft will always stop when the neutral notch 58-60 engages the ball 61, except when or until said shaft is rotated approximately to or beyond a gear selected position.

It can here be noted that one function of the said neutral lock is holding the actuator 20 in a certain neutral longitudinal position so the faces of the rack teeth 21 or 22 will not clash with the faces of the teeth of the gears 11 or 12, respectively, when the actuator 20 is rotated to a selected position. It is obvious that such a neutral lock is necessary for the proper selective positioning of the actuator 20; because, if no such neutral lock were provided, a slight endwise movement of the unselected actuator would cause the partially unmeshed rack and gear teeth to become engaged near their ends and thus interfere with the proper selective rotation of the actuator. Although the neutral lock is shown as located at the operating end of the operating shaft, it is to be understood that such a neutral lock could be located at other points, as, for instance, on the shaft 18.

An intermittent rack 64 is secured to the under side of the actuator 20 with pins 65. The rack 64 meshes with an intermittent Geneva type gear 66.

A shaft 67 is mounted for longitudinal movement in the casing 19 and has rack teeth 68 meshing with a gear 69.

The gear 66 is mounted for rotative and longitudinal movements upon a shaft 70. The gear 69 is secured to the shaft 70 with a pin 71. The adjacent hubs of the gears 66 and 69 have clutching surfaces 72 and 73, respectively. One end of the shaft 70 is mounted in a bearing 74 in a wall of the casing 19 and the other end is mounted in a bearing member 75 screwed into another wall of the casing 19.

A compression spring 76 abuts the inner end of the bearing 74 and the adjacent side wall of the gear 66, being mounted around the shaft 70 and a hub of the gear 66.

An abutment pin 77, secured in a wall of the casing 19, engages a wall of the gear 66, and projections 78 or 79 engage the pin 77 when the gear 66 is turned in one or the other direction and forces the gear 66 endwise against the action of the spring 76, which movement releases the surface 73 from the surface 72.

Figure 7:
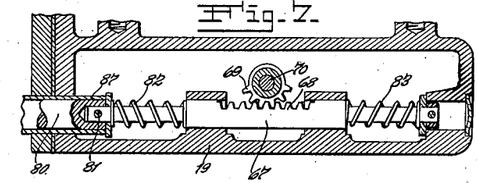
Fig. 7 is a sectional view approximately on the line 7—7 of Fig. 2 showing the devices controlling the valves in the pneumatic operating mechanism.
Figure 8:
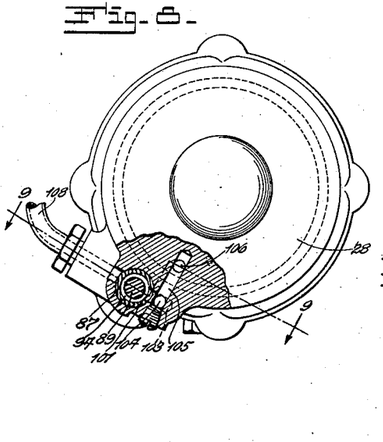
Fig. 8 is an end elevation with parts in section on the line 8—8 of Fig. 9 showing a part of the pneumatic operating mechanism.
Figure 9:
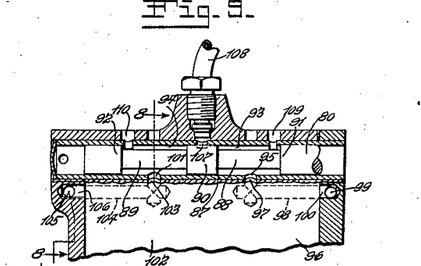
Fig. 9 is a sectional view on the irregular section line 9—9 of Fig. 8.
Figure 10:
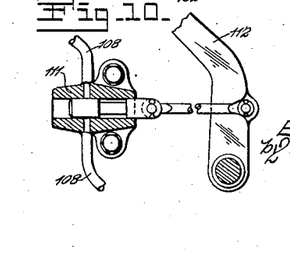
Fig. 10 is a view showing the manually controlled valve mounted in the pneumatic operating mechanism.

The shaft 67 is secured to a port controlling shaft 80 by a pin 81 (Fig. 7). The shafts 67 and 80 are moved longitudinally against the action of either the spring 82 or 83 and either of the springs 82 or 83 so compressed will return the shafts 67 and 80 and the gear 69 to normal position when the surface 73 is released from the surface 72. A bolt 84 is adjustably screwed into the outer end of the bearing 74 against the end of the shaft 70, and the member 75 adjustably screws against the adjacent side of the gear 69. The adjustment of the bolt 84 and the member 75 will time the release of the surface 73 from the surface 72. The proper adjustment will be maintained by tightening the nuts 85 and 86. The port controlling shaft 80 extends into a tube 87 which is securely mounted in the wall of the cylinder 28 and extends into the casing 19. The shaft 80 is reduced in size at 88 and 89 (Fig. 9), forming port closing portions 90, 91 and 92 and air passages 93 and 94.

A port 95 communicates with the reverse and intermediate speed vacuum chamber 96 of the cylinder 28 through holes 97, 98, 99 and 100, and a port 101 communicates with the low and high speed vacuum chamber 102 of the cylinder 28 through holes 103, 104, 105 and 106. A port 107 communicates with the intake manifold of the engine through the tube 108 and is controlled by the portion 90 of the shaft 80. Ports 109 and 110 communicate with the atmospheric air and are controlled by the portions 91 and 92, respectively, of the shaft 80.

The suction in the cylinder 28 is controlled by a cut-off mechanism 111 conveniently located on the tube 108 and operated by the clutch pedal 112. When the clutch is sufficiently depressed the cut-off is open and air allowed to pass through the tube 108. The object is to make the vacuum assistant to the shifting movement inoperative except when the clutch is disconnected.

Figures 11, 12, 13, 14, 15, 16, 17:
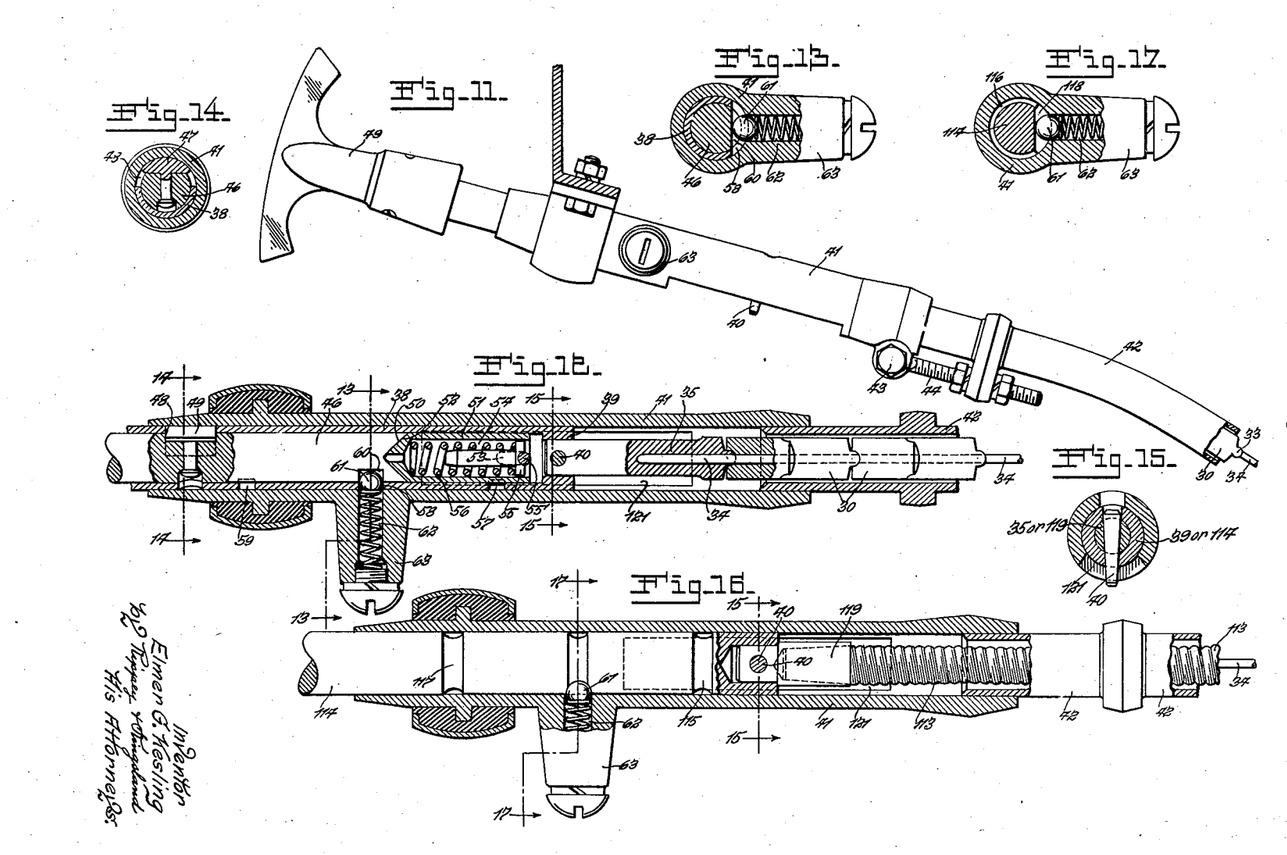
Fig. 11 is a side elevation of the upper end of the operating shaft and its connections.
Fig. 12 is an enlarged longitudinal sectional view of a part of the operating connections shown in elevation in Fig. 11.
Fig. 13 is a sectional view approximately on the line 13—13 of Fig. 12.
Fig. 14 is a cross sectional view approximately on the line 14—14 of Fig. 12.
Fig. 15 is a cross sectional view approximately on the lines 15—15 in Figs. 12 and 16.
Fig. 16 is a view corresponding to Fig. 12 showing a modified form of operating devices.
Fig. 17 is a cross sectional view approximately on the line 17—17 of Fig. 16.

In the modified form shown in Fig. 16, a wound wire flexible shaft 113 is used instead of the flexible segmented shaft, and a solid shaft 114 instead of the tube 38 and shaft 46.

Properly spaced circumferential grooves 115, 116 and 117 are cut around the shaft 114, 115 being positioned for engagement by the ball 61 during reverse and intermediate speeds, 116 being positioned for engagement by the ball 61 during neutral position of the shifter elements and 117 being positioned for engagement by the ball 61 during low and high speeds. The groove 116 is cut deeper at 118 to form the neutral lock.

The lower end (not shown) of the wire wound shaft 113 is intended to be attached directly to the end of the shaft 18, which, in the modified form, will omit the axial hole 31. The other end of the shaft 113 will be soldered into an end of a connector 119. The other end of the connector 119 is secured into a hole in one end of the shaft 114 by the pin 40 which projects beyond the lower side of the shaft 114. The parts 18, 113, 119 and 114 form the manual operating shaft in the modified form. The projecting end of the pin 40 will limit the rotation of the shaft 114 by engaging one or the other of the walls of the slot 121 cut in the under wall of the member 41.

The slot 121 is wider than would be necessary for gear selecting rotations of the shaft 114, but the wire wound shaft 113 has sufficient rotative resiliency for the additional rotation to position the slot 121 for the purpose of unlatching the neutral lock.

After the manual force applied to effect the said additional rotation of the shaft 114 is released the resiliency of the shaft 113 will return the shaft 114 to the normal relative position.

The slot 118 is cut deep enough and circumferentially long enough so that the longitudinal movements of the manual operating shaft will always stop when the neutral notch 116—118 is engaged by the ball 61, except when or until the said shaft is rotated beyond a gear selected position.

In the operation of the device, the following conditions will be noted: That the shaft 18 and actuator 20 cannot be rocked except when in such longitudinal position that the surfaces 13 and 14 coincide, which condition allows the surface 24 to be moved over both or either of the surfaces 13 and/or 14; that the cutaway portions 17 make it possible to start the rocking of the actuator from one extreme to the other without first precisely or definitely locating the surfaces 13 and 14; that the said parts 18—20 cannot be moved longitudinally except when entirely rocked one way or the other so that the surface 24 is entirely free of 14 or 13, and the teeth 21 or 22 are entirely in mesh with the teeth of the gear 11 or 12, respectively; that as soon as the said 18—20 is substantially moved longitudinally in either direction, rotation of the said parts 18—20 will be prevented by the engagement of the surface 15 with the surface 25 or the engagement of the surface 16 with the surface 26, as the case may be; that the gear 11 or 12 not in mesh with the rack 21 or 22, respectively, will be held against turning by the surface 24 engaging the surface 13 or 14 as the case may be; that a gear selected position is the full rotation allowed the actuator 20 in either direction; that the operating end of the operating shaft may be turned an additional distance beyond the selected position against resilient means within the shaft and will be returned to the normal relation by the said resilient means when the manual force is released; that, when the neutral notch 58—60 is engaged by the ball 61, the operating shaft will be locked against longitudinal movements except when or until the operating end of the operating shaft has been turned substantially to or beyond a selected position; that upon a definite initial shifting movement of the operating shaft and actuator 20 effected by manual force, certain port controlling means will have been moved against the resilient means 82 or 83, as the case may be, to a position where, if the engine clutch is released, a vacuum cylinder will complete or, at least, assist the manual force in completing the said shifting movements, whereupon the port controlling means described will have been released to be returned to normal position by the said resilient means 82 or 83; and that the piston 27 and the operating shaft and associate parts are always returned to neutral position by manual force.

Therefore, to make a shift into either low or reverse speed, starting from neutral position, manual force is applied to the operating shaft to turn the actuator 20 to the fully selected position where the rack 21 will be entirely in mesh with the gear 11 and the surface 24 will be entirely free from the surface 13 and if necessary to continue to turn the operating end of the operating shaft until the ball 61 is freed from the neutral lock, and then to move the operating shaft and actuator 20 longitudinally to shift the selected gear as desired through the parts 11, 1, 4, 5 and 6, and to operate the port controlling mechanism to allow the vacuum cylinder to assist in the shifting movements, if the clutch has been depressed. To shift to intermediate or high speed, the parts are brought to neutral position by manual force and the operating shaft is turned to place the actuator 20 in the fully selected position where the rack 22 will be entirely in mesh with the gear 12 and the surface 24 will be entirely free from the surface 14, and, if necessary turning of the operating end of the operating shaft is continued until the ball 61 is freed from the neutral lock, and then manual force is applied to move the operating shaft and actuator 20 longitudinally to shift the selected gear as desired through the parts 12, 7, 8, 9 and 10, and to operate the port controlling mechanism to allow the vacuum cylinder to assist in the shifting movements, if the clutch has been depressed.

When any selected shift has been completed, the teeth at the end of the intermittent rack 64 will have turned the gear 66 a sufficient distance for the pin 77 to have caused the projections 78 or 79 to have moved the gear 66 endwise, against the action of the spring 76, to free the surface 73 from the surface 72 and allow the ports to be placed in normal position by the action of either the spring 82 or 83. The surfaces 72 and 73 will reengage when the actuator has again been brought to neutral position.

The gear shifting yokes 6 and 10 have an unequal range of movement in their respective shifting operations, and the integral racks 5 and 9 have proportional lengths, respectively. The gears 4 and 8 meshing with said racks have pitch diameters in proportion to the length of said respective racks; therefore, the shafts 1 and 7 have an equal range of movement in effecting the unequal range of shifting movements.

In automobiles where no synchronizer is used, the vacuum assistant mechanism will not be necessary as shifting can easily be completed by manual force only, and the neutral lock will be unnecessary.

In some cases where a synchronizer is used the vacuum assistant mechanism may need to be used only on the synchronized gears, high and intermediate. This can be done by arranging the intermittent rack in such a way that the gear 66 will not be engaged except when the synchronized speeds are selected.

I do not restrict myself in any unessential respects but what I claim and desire to secure by Letters Patent is:

1. Gear shifting mechanism of the character described comprising elements to be shifted, connections for shifting said elements respectively, an actuator, a device supported by said actuator for each of said connections engageable with said connections selectively for moving the selected connection, means integral with said actuator for locking the unselected connections against movement, and manual means for operating said actuator.

2. Gear shifting mechanism of the character described comprising elements to be shifted, gear devices for shifting said elements respectively, an actuator, a rack supported by said actuator for each of said gear devices engageable with said gear devices selectively for moving the selected gear device, means integral with said actuator for locking the unselected gear devices against movement, and manual means for operating said actuator.

3. Gear shifting mechanism of the character described comprising a number of elements to be shifted, gearings for shifting said elements respectively, a single actuator, a rack integral with said actuator for each of said gearings rockable to selectively engage one of said racks with the respective gearings and movable longitudinally for rotating said selected gearings to shift said elements, manual means to move said actuator, and additional mechanism operatively connected with said actuator and with said manual means for assisting said manual means in operating said actuator.

4. Gear shifting mechanism of the character described comprising shifter elements, gear devices for shifting said shifter elements, an actuator, racks integral with said actuator selectively engageable with said gear devices respectively, manual means for operating said actuator to selectively engage said gear devices and to operate the selected gear devices to shift the shifter elements, and additional mechanism operatively connected with said actuator and with said manual means for assisting said manual means in operating said actuator.

5. Gear shifting mechanism of the character described comprising shifter elements, gear devices for shifting said shifter elements, an actuator mounted for rocking and longitudinal movements, racks integral with said actuator selectively engageable with said gear devices respectively, manual means for operating said actuator to selectively engage said gear devices and to operate the selected gear devices to shift the shifter elements as desired, locking means supported and operated by said actuator to lock the unselected gear device against movement, and additional mechanism operatively connected with said actuator and with said manual means for assisting said manual means in operating said actuator.

6. Gear shifting mechanism of the character described comprising shifter elements, gear devices for shifting said shifter elements, a plurality of actuating racks each selectively engageable with one of said gear devices, manual means supporting said racks and being rotative to selectively engage and movable longitudinally to actuate said racks to shift the shifter elements as desired, and additional mechanism operatively connected with said actuator and with said manual means for assisting said manual means in operating said actuator.

7. Gear shifting mechanism of the character described comprising elements to be shifted, connections for shifting said elements respectively, an actuator, a device supported by said actuator for each of said connections engageable with said connections selectively for moving the selected connection and having means for locking the unselected connections against movements, manual means for operating said actuator, and additional mechanism operatively connected with said actuator and with said manual means for assisting said manual means in operating said actuator.

8. Gear shifting mechanism of the character described comprising elements to be shifted, gear devices for shifting said elements respectively, an actuator, a rack supported by said actuator for each of said gear devices engageable with said gear devices selectively for moving the selected gear device and having means for locking the unselected gear devices against movement, manual means for operating said actuator, and additional mechanism operatively connected with said actuator and with said manual means for assisting said manual means in operating said actuator.

9. Gear shifting mechanism of the character described comprising a shaft mounted for rocking and longitudinal movements, a second shaft connected to said first shaft for moving said first shaft and having additional rotation beyond that of said first shaft, means engageable to lock said shafts against longitudinal movements until said second shaft is given said additional rotation but not engageable after said second shaft is given said additional rotation, and manual operating means connected to said second shaft.

10. Gear shifting mechanism of the character described comprising a pair of gear shifter elements having unequal ranges of movements, a pair of connections having approximately equal ranges of movements for moving said shifter elements through said unequal ranges of movements respectively, an actuator for moving said connections respectively, and a shaft connected with said actuator and being rotatable to selectively position said actuator and movable longitudinally to operate said actuator to effect the shift selected.

11. Gear shifting mechanism of the character described comprising a shaft supported for rocking and longitudinal movements, an operating shaft, means for operating said first shaft by said operating shaft and leaving said operating shaft free to rotate beyond said first shaft, and means for preventing longitudinal movement of said shafts until said operating shaft has been rotated beyond said first shaft.

12. Gear shifting mechanism of the character described comprising a shaft supported for rocking and longitudinal movements, an operating shaft for imparting rocking and initial longitudinal movements to said first shaft, a connection for operating said first shaft by said operating shaft leaving said operating shaft free to rotate beyond said first shaft, means preventing said shafts from moving longitudinally until said operating shaft is moved beyond said first shaft, means for imparting rotation and initial longitudinal movements to said shafts, and pneumatic means for assisting final longitudinal movements of said operating shaft after said operating shaft has been rotated beyond said first shaft.

13. Gear shifting mechanism of the character described comprising a shaft supported for rocking and longitudinal movements, an operating shaft differentially rotative with respect to said first shaft and connected thereto for rotating and imparting initial longitudinal movements to said first shaft, and means for preventing longitudinal movement of said shafts until said operating shaft has been differentially rotated with respect to said first shaft.

14. Gear shifting mechanism of the character described comprising a shaft supported for rocking and longitudinal movements, an operating shaft supported for differential rotation with respect to said first shaft, a device for imparting rotative and initial longitudinal movements to said first shaft by said operating shaft, resilient means controlling said device for effective operation by said operating shaft, and means for preventing said initial longitudinal movement of said first shaft by said operating shaft until said operating shaft has been rotated differentially with respect to said first shaft.

15. Gear shifting mechanism of the character described comprising a shaft supported for rocking and longitudinal movements, an operating shaft supported for differential rotation with respect to said first shaft, a device for imparting rotative and initial longitudinal movements to said first shaft by said operating shaft, resilient means controlling said device for effective operation by said operating shaft, means for preventing said initial longitudinal movement of said first shaft by said operating shaft until said operating shaft has been rotated differentially with respect to said first shaft, and pneumatic means for assisting final longitudinal movement of said first shaft after initial longitudinal movement of said first shaft by said operating shaft.

16. Gear shifting mechanism of the character described comprising a pair of gear shifter elements having unequal ranges of movements, a pair of connections having approximately equal ranges of movements for moving said shifter elements respectively, manual means for imparting initial movements to said connections selectively, and pneumatic means operatively connected with said manual means for assisting said manual means in moving said connections through their final movements.

17. Gear shifting mechanism of the character described comprising shifter elements, a pair of gear segments for shifting said shifter elements, cut-away surfaces formed on the hubs of said gear segments, a pair of racks selectively engageable with said gear segments respectively, a rib integral with said racks for cooperation with either of said cut-away surfaces to lock the unselected gear segment against rotation, and manual means for operating said racks and said rib to selectively engage said gear segments and said cut-away surfaces respectively and to operate the selected gear segment to shift the shifter elements while the unselected gear segment is held against movement by said rib.

18. Gear shifting mechanism of the character described comprising shifter elements, gear devices for shifting said shifter elements, a locking surface formed upon each of said gear devices, an actuating shaft, racks rigidly secured to said actuating shaft selectively engageable with said gear devices respectively for moving the selected gear device and having an integral rib for engaging said locking surface of the unselected gear device to lock said unselected gear device against movement, and manual means for operating said actuating shaft.

19. Gear shifting mechanism of the character described comprising a plurality of gear shifter elements having unequal ranges of movements, a plurality of connections having approximately equal ranges of movements for moving said shifter elements through said unequal ranges of movements respectively, and manual means rockable to engage said connections selectively and movable longitudinally to operate the selected connection to shift the shifter elements as desired.

20. Gear shifting mechanism of the character described comprising shifter elements, toothed segments for shifting said elements respectively, a member mounted for rocking and longitudinal movements, racks mounted on said member selectively engageable with said toothed segments respectively by rocking movements of said member and movable longitudinally to operate the engaged toothed segment, suction means connected to said racks and controlled by longitudinal movements of said member, and manual means for operating said member to selectively engage said racks with said toothed segments and to control said suction means whereupon said suction means moves the selected rack and toothed segment to shift the shifter elements as desired.

21. Gear shifting mechanism of the character described comprising shifter elements, devices for selectively shifting said elements respectively, air ports, suction means operatively connected with said devices and controlled by suction through said air ports, an operative member rotatively movable to position said devices selectively and longitudinally movable to control passage of suction through said air ports, whereupon said suction means actuates the selected devices to shift the shifter elements as desired.

22. Gear shifting mechanism of the character described comprising shifter elements having unequal ranges of movements, gearing having approximately equal ranges of movements for shifting said elements respectively, a single actuator, a rack integral with said actuator for each of said gearings rockable to selectively engage one of said racks with the respective gearings and movable longitudinally for rotating said selected gearings to shift the shifter elements, and manual means to move said actuator.

23. Gear shifting mechanism of the character described comprising shifter elements having unequal ranges of movements, gear devices having approximately equal ranges of movements for shifting said shifter elements respectively through said unequal ranges of movements, an actuator, racks integral with said actuator selectively engageable with said gear devices respectively, and manual means for rocking said actuator to selectively engage said racks with said gear devices and moving said actuator longitudinally to operate the selected gear devices to shift the shifter elements.

24. Gear shifting mechanism of the character described comprising shifter elements having unequal ranges of movements, gear devices having approximately equal ranges of movements for shifting said shifter elements respectively through said unequal ranges of movements, an actuator mounted for rocking and longitudinal movements, racks integral with said actuator selectively engageable with said gear devices respectively, and manual means for rocking said actuator to selectively engage said racks with said gear devices and moving said actuator longitudinally to operate the selected gear devices to shift the shifter elements.

25. Gear shifting mechanism of the character described comprising shifter elements having unequal ranges of movements, gear devices having approximately equal ranges of movements for shifting said shifter elements respectively through said unequal ranges of movements, a plurality of actuating racks each selectively engageable with one of said gear devices, and manual means supporting said racks and being rotative to selectively engage, and being movable longitudinally to actuate, said racks to shift the shifter elements as desired.

26. Gear shifting mechanism of the character described comprising shifter elements having unequal ranges of movements, connections having approximately equal ranges of movements for moving said shifter elements respectively, manual means rockable to engage said connections selectively and movable longitudinally to operate the selected connection to shift the shifter elements, and locking means supported and controlled by said manual means for locking the unselected connection against movement.

27. Gear shifting mechanism of the character described comprising shifter elements, connections for shifting said elements respectively, manual means rockable to engage said connections selectively and movable longitudinally to operate the selected connection to shift the shifter elements, and means integral with said manual means for locking the unselected connections against movement.

28. Gear shifting mechanism of the character described comprising shifter elements, connections for shifting said elements respectively, an actuator rockable to engage said connections selectively and slidable longitudinally to move the selected connections, means integral with said actuator for locking the unselected connections against movement, and operating means connected to said actuator to operate said actuator to effect a selection and to move the selected connection to shift the shifter elements as desired.

29. Gear shifting mechanism of the character described comprising shifter elements, a rocking gear device in permanent engagement with each of said shifter elements, an actuator mounted for rocking and longitudinal movements, racks rigid with said actuator selectively engageable with said gear devices respectively, manual means for rocking said actuator to engage said racks with said gear devices selectively and for moving said actuator longitudinally to rock the selected gear devices and shift the shifter elements as desired, and a device controlled by said manual means for locking the unselected gear device.

30. Mechanism of the character described comprising shifter elements, connections for shifting said shifter elements, a pair of gears mounted in spaced axial relation, an actuator supported substantially between said gears for rocking and longitudinal movements, a rack connected with said actuator for each of said gears rockable to selectively engage one of said racks with the respective gear and movable longitudinally for rotating the selected gear to move said connections and shift said shifter elements and means for rocking and moving said actuator longitudinally.

31. Mechanism of the character described comprising elements to be shifted, gearings for shifting said elements respectively, an actuator supported for rotative selective movements and longitudinal shifting movements for operating said gearings selectively, and means integral with said actuator for locking the unselected gearings against movement.

32. Mechanism of the character described comprising shifter elements, gear devices for shifting said shifter elements respectively, an actuator, racks connected with said actuator selectively engageable with said gear devices respectively, means operatively connected to said actuator for selectively positioning said actuator, and suction means directly connected to said actuator for moving said actuator to rotate said selected gear devices to shift said shifter elements.

33. Mechanism of the character described comprising shifter elements, connections for shifting said shifter elements respectively, an actuator, a separate device supported by said actuator for each of said connections engageable with said connections selectively for moving the selected connection, means operatively connected with said actuator to selectively engage said device, and suction means directly attached to said actuator to move said actuator and selected device to shift said shifter elements.

34. Mechanism of the character described comprising shifter elements, gearings for shifting said shifter elements respectively, an actuator for turning said gearings selectively, means for selectively positioning said actuator, and suction mechanism directly connected to said actuator for operating said actuator and turning the selected gearings to shift the shifter elements.

35. Mechanism of the character described comprising shifter elements, gear devices for shifting said shifter elements, a plurality of actuating racks each selectively engageable with one of said gear devices, means operatively connected with said racks for selectively positioning said racks, a suction device directly attached to said racks for moving said selectively positioned rack to shift said shifter elements, and manually operated mechanism for controlling said means and said suction device.

36. Mechanism of the character described comprising elements to be shifted, gearings for shifting said elements respectively, an actuator supported for rotative selective movements and longitudinal shifting movements, selective means for imparting selective movements to said actuator, other means for imparting shifting movements to said actuator, and operative means for controlling said selective means and said other means to select and shift said elements.

37. Mechanism of the character described comprising shifter elements supported in a casing, a second casing, connections extending into both of said casings for shifting said shifter elements respectively, a vacuum cylinder secured to said second casing, an actuator mounted in said second casing for moving said connections selectively and extended into said vacuum cylinder, means for selectively positioning said actuator, and suction means mounted in said cylinder and attached to said actuator for moving said actuator to turn the selected gearings to shift the shifter elements.

38. Mechanism of the character described comprising a supporting device, a device mounted in said supporting device and rotative to and from the extremes of a given arc of rotation and movable longitudinally to and from a central position, one of said devices having thereon a notch of varying depth, and means cooperating with said notch for locking said second device against longitudinal movements from said central position until after said second device has been rotated to an extreme of said arc of rotation.

39. Mechanism of the character described comprising elements to be shifted unequal distances, gearing and rockable approximately equal distances for shifting said elements respectively through said unequal ranges of movements, and an actuator supported for uniform longitudinal and turning movements for operating said gearings selectively.

40. Mechanism of the character described comprising shifter elements, connections for shifting said elements, an actuator mounted for rotative selective movements and longitudinal shifting movements for actuating said connections selectively, a supporting device, a device mounted in said supporting device and operatively connected to said actuator, one of said devices having thereon a notch of varying depth, and means cooperating with said notch for locking said second device and said actuator against longitudinal movements until after said actuator has been rotated to a substantially selected position.

41. Mechanism of the character described comprising elements to be shifted unequal distances, connections for moving said elements respectively, and an actuator rockable to engage said connections selectively and movable longitudinally equal distances to shift said elements through said unequal distances.

42. Mechanism of the character described comprising shifter elements supported for shifting movements through unequal distances, rotary connections for shifting said elements through said unequal distances by turning movements of said connections through equal angles of rotation, and an actuator selectively engageable with said connections and movable longitudinally equal distances to rotate said connections, and thereby shift said elements through said unequal distances.

43. Mechanism of the character described comprising shifter elements supported for unequal shifting movements, devices having permanent engagement with said elements, respectively, for imparting said unequal movements to said elements, and an actuator movable into engagement with said connections selectively and then being movable longitudinally equal distances to impart said unequal movements to said shifter elements.

44. Mechanism of the character described comprising elements supported for shifting movements through unequal distances, connections movable approximately equal distances for imparting said movements to said elements respectively, and an actuator supported for turning movements to engage said connections, respectively, and for uniform longitudinal movements to operate said connections, and thereby operate said elements through said unequal distances.

45. Mechanism of the character described comprising a device to be operated and mounted for limited rocking and longitudinal movements, an operating device, a resilient connection for operating said first named device by said operating device and leaving said operating device free for additional rotative movement relative to said first named device and in opposition to said resilient connection, and means for locking said devices against longitudinal movements until said operating device has been given said additional rotation.

46. Mechanism of the character described comprising a support, a shaft mounted in said support for rotation from a normal relative position and subsequent longitudinal movement from a neutral position, a device for locking said shaft against longitudinal movement from said neutral position while said shaft remains in said normal relative position, a device to be operated, and a resilient connection for operating said second device by said shaft and leaving said shaft free for additional rotative movement relative to said second device in opposition to said resilient connection.

47. Mechanism of the character described comprising an operating device supported for turning movements from and to a normal relative position and for subsequent longitudinal movements from a neutral position, a device mounted for limited rocking and longitudinal movements, and a resilient connection for imparting said rocking and longitudinal movements to said second device by said first named device and leaving said operating device free for additional rotative movement relative to said second device and for returning said first named device to its normal relative position.

ELMER G. KESLING.

CERTIFICATE OF CORRECTION.

Patent No. 2,052,573. September 1, 1936.

ELMER G. KESLING.

It is hereby certified that error appears in the printed specification of the above numbered patent requiring correction as follows: Page 7, first column, line 54, claim 39, for the words "gearing and" read gearings; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.